US008775059B2

(12) United States Patent
Heed et al.

(10) Patent No.: US 8,775,059 B2
(45) Date of Patent: Jul. 8, 2014

(54) METHOD AND SYSTEM FOR FLEET NAVIGATION, DISPATCHING AND MULTI-VEHICLE, MULTI-DESTINATION ROUTING

(71) Applicant: Thomas Heed, Ann Arbor, MI (US)

(72) Inventors: John Culver Heed, Milan, MI (US); Thomas Paul Heed, Ann Arbor, MI (US)

(73) Assignee: Right There Ware LLC, Milan, MI (US)

( * ) Notice: Subject to any disclaimer, the term of this patent is extended or adjusted under 35 U.S.C. 154(b) by 0 days.

(21) Appl. No.: 13/660,977

(22) Filed: Oct. 25, 2012

(65) Prior Publication Data

US 2013/0110385 A1      May 2, 2013

Related U.S. Application Data

(60) Provisional application No. 61/628,147, filed on Oct. 26, 2011.

(51) Int. Cl.
*G06F 19/00* (2011.01)

(52) U.S. Cl.
USPC .......................................... 701/117

(58) Field of Classification Search
USPC ........................................ 701/117
See application file for complete search history.

(56) References Cited

U.S. PATENT DOCUMENTS

| | | | |
|---|---|---|---|
| 2003/0191578 A1* | 10/2003 | Paulauskas et al. | 701/200 |
| 2006/0058941 A1* | 3/2006 | DeKock et al. | 701/117 |
| 2008/0051995 A1* | 2/2008 | Lokshin et al. | 701/210 |
| 2008/0195428 A1* | 8/2008 | O'Sullivan | 705/6 |
| 2010/0332113 A1* | 12/2010 | Tengler et al. | 701/123 |

* cited by examiner

*Primary Examiner* — Mary Cheung
*Assistant Examiner* — Anne Mazzara
(74) *Attorney, Agent, or Firm* — Thomas P. Heed

(57) ABSTRACT

A system and method for multiple vehicles to be dispatched and routed to multiple destinations, with or without constraints, containing a software core, which uses bounded geographic regions ("BGRs") and Node Pairs to explicitly optimize, in two dimensions, for user desired dependent variables, by analyzing variance due to standard and user-defined independent variables. The invention stores Node Pair data, and can use error function, feedback, and ANOVA/MANOVA to create a tightly convergent dispatching and navigation solution.

15 Claims, 11 Drawing Sheets

METHOD AND SYSTEM FOR FLEET NAVIGATION, DISPATCHING AND MULTI-VEHICLE, MULTI-DESTINATION ROUTING

FIELD OF INVENTION

This invention relates to the field of navigation route calculation and guidance, specifically multi-vehicle, multi-destinations solutions to a generalized navigation problem.

BACKGROUND OF INVENTION

Navigation systems contain certain required basics: input/output device(s); a processing unit, a navigation calculation core; geographic database usually including streets and Points of Interest ("POIs"); and a Global Positioning System chip-set to determine position; inter alia. For automotive systems, there is additionally a gyroscopic chip that provides heading and speed information. Significant disadvantages exist with current systems. Navigation systems built into vehicles by the OEMS require expensive hardware and software, which becomes obsolete far sooner than the car in which it is installed. Additionally, the on-board geographic database requires a storage medium, such as a hard-drive, which, relatively, are more prone to failure than other electronics components, and the database must be updated periodically.

Server-based navigation systems are those in which guidance algorithm is resident on a central processing unit or server. End users input navigation destinations using a variety of devices, including mobile phones, computers, portable navigation devices, embedded vehicle systems and mobile data terminals ("MDT"). The end user request is communicated to the server wirelessly, either via a mobile phone network, a satellite network, a Wi-Fi network, or mixed network containing both wireless and wired connections. The wireless link can be interrupted in a number of circumstances (e.g., tunnels, concrete canyons in the centers of major cities, in unpopulated areas, and at times of heavy wireless usage). Depending on how the system was configured, the amount of data that needs to be transmitted often overwhelms the wireless resource. Cellphone and personal navigation are similarly limited.

In any geographic region, there are a small number of sources for the navigation database information, itself. A navigation database will provide coordinates and names for streets, as well as defining a street-type for each road (e.g., residential, commercial, highway, interstate, etc.). Often, the navigation database will also include points of interest ("POIs"), which are local business, places of civic or historic significance, schools, churches, and other places frequented by the public. In the United States, the U.S. Census Bureau offers Topologically Integrated Geographic Encoding and Referencing system data ("TIGER data"). TIGER data does not contain a complete set of navigatable streets in the U.S., nor does it provide POIs. There are multiple commercial providers of navigation databases, who provide POIs and a substantially complete set of navigatable streets. The two largest, in the United States, are Navteq® and Tele Atlas®. Unless the text is specifically contrary, the use of POIs in this patent means the general idea of points of interests, rather than any specific, discrete collection of points of interests. In Korea and Japan, the navigation databases are government controlled. Other jurisdictions range from government-owned to private services providing the navigation databases. Additional navigation and navigation database competitors are rapidly entering the market, including Apple and Google. Additionally, the crowdsourcing revolution is impacting map databases. For example, MapBox is working on an open-source collaborative map database called OpenStreetMap. In general, at this point, almost all vehicular and mobile phone navigation relies on navigation software from one source, and a complimentary navigation database from another source. Almost always, a single entity bundles and sells the navigations components as a complete solution.

Despite its limitations, the last two decades have seen a proliferation of advanced electronics aimed at navigation. Two decades ago, most vehicles had very little electronic content, and cellphone or mobile phones were in their infancy. Today, the revolution in vehicle and wireless electronics has made global-positioning based navigation ubiquitous. However, the proliferation of options for consumers has not presented an optimized overall solution, yet. Most navigation solutions rely on computational cores which are more than a decade old.

All current navigation algorithms rely on one-dimensional optimization. All streets are represented by vectors of varying length and shape. Fundamentally there are two ways the current methods represent streets. In the first, all vectors are straight line vectors. Curves are decomposed into a number of straight line segments. In the second, curves and splines of one form or another are used to mimic the natural curvature of the roads.

In order to find a route, current algorithms piece-wise optimize in one dimension. Many individual algorithms exist to perform one-dimensional piece-wise navigation optimization, including, but not limited to, single-sided decision tree, double-sided decision tree, single-sided decision tree with gates, double-sided decision tree with gates, buckets, and leaky buckets. Multiple route segments are grown from either the origin or both the origin and the destination. The routes are compared with one another during the process, and a single or multiple rejection criteria are established to discard divergent solutions. Ultimately, a single route is grown between the origin and the destination, either meeting in the middle (in the case of piece-wise solutions growing from both the origin and the destination) or at the destination (in the case of piece-wise solutions growing only from the origin). Strangely enough, if the process was truly piece-wise optimizing a solution, it would be irrelevant for calculation purposes whether the algorithm started at the origin or the destination. In many algorithms, the calculation will pick different routes in a single-sided decision when the origin and destination are reversed. Some algorithms correct for this by calculating both routes and then presenting the more efficient or optimized route to the end user.

The process is facilitated by road weighting. Essentially, interstates and other highways are more highly weighted than major surface thoroughfares. Major surface roads are weighted more heavily than paved secondary roads, which, in turn, are weighted more heavily than residential streets. The weighting combines with the piece-wise, one-dimensional optimization to select a route between any origin and destination. Unfortunately, such weighting often ends up with "interstate bias." Many users of navigation systems have noted that the systems tend to prefer interstate or highway routes, even when they are significantly detour from the straight line between the origin and destination.

The major characterization to take away about today's technology is that it creates routes using piece-wise optimization and weighting. It does not create explicit solutions, even in the relatively local area, even though modern processors and algorithms would easily allow explicit local solutions. Piece-wise optimization and weighting creates a bias towards interstate or highway travel. Such antiquated computational cores create legacy artifacts, which substantially affects the performance of today's navigation systems. These cores were written for slow processors, such as the first generation of RTOS processors. These cores assumed a much smaller volume of data than what can currently be handled (e.g., petabyte systems). These cores assumed that wireless data transfer, if any, would be at substantially slower speeds than what is currently capable.

This is not to say that companies have not been updating their software over the past twenty years. What it means is that, when a piece of core software is initially written, many limitations are inherently built-in, either through commission or omission, which makes it difficult to create an update which is truly up-to-date. Additionally, when re-envisioning their software, most software teams have unstated (often unconscious) pre-conceptions about what is possible, because they are starting from a knowledge-base that includes their legacy code.

The legacy artifacts caused by antiquated navigational cores include inaccurate estimated-time-of-arrival ("ETA") calculations, lack of learning, inability to handle multi-vehicle/multi-destination problems with the same software that is used for normal navigation, inability to optimize the solution for multi-vehicle/multi-destination problems, the inability to reasonably assess when the user has substantially diverted from the calculated route, and the inability to pass navigation back-and-forth between devices (e.g., between an in-car unit and a cellphone).

Most navigation systems are capable of giving an ETA with a 10% error rate, or less, 80-90% of the time. Most consumers are satisfied with this because (1) they don't rely on the ETA information as their only estimate of their arrival time; (2) the ETA information is better information than what they have from other sources; and/or (3) end-users have normalized their expectations to the system performance level available. However, there are categories of users for whom the error rate is strictly unacceptable. For example, commercial vehicle drivers, commercial fleet operators, people on a tight deadline, and people living in congested areas (where current technology under-performs).

Poor ETAs are partially related to the inability of current navigation cores to learn in any meaningful sense. For example, most people know that on Monday morning (excluding holidays), Interstate 405 in Los Angeles is going to be congested at 8:00 a.m. Current navigation cores do not. Likewise, I-696 in metropolitan Detroit, I-90/94 in Chicago, I-95 in Boston, and many other major interstates in major cities are routinely congested. Travel speeds at rush hour on these roads can vary between 60 m.p.h. and 10 m.p.h., on average. Much of the variation is entirely predictable: particular times, days, and conditions are particularly bad, such as Friday afternoons and rain. Unfortunately, current navigation solutions are unable to assess this situation a priori.

Current systems attempt to mask this problem with "dynamic navigation." Dynamic navigation usually entails using "real-time" traffic data, at an additional cost to the user, to re-route the user if there is congestion. Realistically speaking, there is nothing dynamic about dynamic navigation. Most "real-time" traffic reports have a latency of 20 minutes or more, and come from a single source. With little or no motivation to improve performance in a monopolized field, traffic data fed into dynamic navigation systems is atrophying. Moreover, routinely starting a route towards traffic congestion, only to be re-routed when the navigation system's weighting function finally calculates an actionable event from real-time traffic messaging system, creates a big issue, costs the end-user time, money, and tranquility.

None of the current navigation systems handle multi-vehicle/multi-destination problems. Rather, fleet owners and others who are in need of such service must purchase both a navigation package and a dispatch package, or purchase a dispatch package with an embedded navigation package. These solutions are more antiquated than the traditional navigation cores. They also fail to realize that the multi-vehicle/multi-destination navigation solution is just a mathematical generalization of the single-vehicle/single-destination problem. In fact, most of the current navigation packages can now perform a single vehicle navigation to multiple destinations. Unfortunately, it is doing it in a linear piece-wise method (computationally inefficient and ineffective), rather than in an integrated fashion (computationally efficient and effective).

The commercially available dispatch systems which attempt to solve the multiple vehicle/multiple destinations problems do a poor job. In fact, in many market segments, such as vehicles for hire, users prefer performing these activities by hand, because the output from commercially available software is so sub-optimal that it represents a larger cost than performing the activities by hand.

The poor solutions for multi-vehicle, multi-destination navigation pose numerous costs to the users and to society. For example, large fleet owners, who use products with 10% error for their ETA, routinely have to choose between having more vehicle than needed on a given day (added expense) or loosening service standards (losing customers). For many people, this problem presents itself during in-home service calls. Cable companies, phone companies, and repair personnel routinely tell people generalized times, such as 9 a.m. to noon, rather than giving a more precise time. This leads to frustrated consumers and a loss of business (people, out of necessity, have to forego the service call).

Most people have learned preferred routes near their homes and businesses. These preferred routes offer the user a quicker and/or more convenient route. If a user continually traverses a preferred route, current navigation cores are incapable of incorporating the data in a meaningful way.

There are some solutions on the market that attempt to mask this inadequacy, by "learning" a preferred route. However, the way these systems work, the user has to travel between point A and point B. With repetition, the system will learn preferred sub-routes on which to guide the user between point A and point B. However, the systems are unable to generalize this information in a way which is useful to the end user. Most users would find dubious value in a system that will tell them the route they should take, after they have taken that route three or four times. What users desire is a way to take information, such as the avoidance of traffic control devices, particular ways into or out of business parks, shopping centers and residential sub-divisions, and generalize the information to all other route guidance performed by the unit.

The commercially available navigation software cores all have issues when it comes to reasonably re-routing people. In most systems, any divergence from the calculated route will cause the system to re-calculate a solution, which will essentially get the user back onto the originally calculated route. These re-calculations usually entail back-tracking, zigzagging, or returning the user, immediately, to the original route. There is no provision possible for small divergences from the proposed route, seamlessly re-introducing the user into the originally propose route at a reasonable distance.

Current navigation systems also lack interoperability. An end-user may have one system in their car, one on their laptop, and one on their cellphone. However, with few exceptions, little data can be passed from one to another. Additionally, it is impossible to start a navigation on a cellphone, enter into a vehicle, and have the vehicle's navigation system provide the navigation calculated on the cellphone.

SUMMARY OF THE INVENTION

Like most navigation systems, this one includes input/output devices with user interfaces, a method for geo-locating (e.g., a GPS antennae and chip-set), a server-based navigation database, end-user processor(s) and memory, server-based processor(s) and memory, a wireless method for communicating between the end-user and server, and a navigation software core.

Like many systems, the user will input a destination, using either POIs, an address, or memory. The origin is assumed to be the current location of the user, unless some other point is specified. The user may specify shortest time, shortest distance, user defined cost functions (such as least gas), or exclusions (e.g., no interstates or no toll roads). To get from the origin to the destination, the invention will calculate a navigation solution.

It is possible, on the surface of the Earth, or on any abstraction representing a portion of the surface of the Earth, to create bounded geographic regions ("BGRs") in any localized area in which a user wants the assistance of a navigation device. Within each BGR there will be a plurality of streets and points of interest ("POIs"). On the periphery of the BGR, there will be nodes, representing the intersection of streets with the boundaries of the BGR.

When navigating within a BGR, there are only four possibilities: (1) the user enters the BGR at one node, and exits the BGR through another node; (2) the user originates a trip within the BGR and exits the BGR through a node; (3) the user enters the BGR through a node and the destination resides within the BGR; or (4) the origin and destination both reside within the BGR. In case 2, the origin will be treated as a node for calculation purposes. In case 3, the destination will be treated as a node for calculation purposes. In case 4, both the origin and destination will be treated as a node for calculation purposes. Therefore, in every BGR, it is possible to identify a finite number of Node Pairs, representing the total possible solution set for traversing the BGR. Additionally, BGRs are sized so that a quick, explicit solution is possible for every Node Pair.

This invention will optimize some user-defined dependent variable for the end user: (1) time; (2) distance; (3) fuel; (4) cost; or (5) other commercially-valuable, user-defined dependent variable. The invention will do this by creating an estimating function, which can be used to provide a value for each Node Pair. The estimating function will use weighting factors, based on the road-type from the navigation database, as well as historical data, to create the value for each Node Pair.

The navigation software core will identify a finite numbers of BGRs, which will be in reasonable geographic proximity between the origin and destination, in which to calculate solutions. By determining the value for each Node Pair for each BGR, it is possible to solve for the optimizing solution, explicitly. By creating BGRs which are small enough to that an explicit solution is possible, this system and method will allow a two-dimensional optimization for routing.

Once a solution is calculated for a Node Pair, the solution is saved in a Node Pair Look-Up Table ("NPLUT"). The NPLUT is sorted by BGR, so that at any given time, only the most local solutions are presented to the processing unit, improving speed and efficiency. The unit can compare actual performance to the calculated value for each Node Pair. Using an error function, the unit can adjust the stored solution for the Node Pair. Furthermore, the NPLUT can store both variable and attribute (digital event or flag) data, allowing for full-factorial ANOVA or MANOVA calculations, depending on the number of dependent variables of interest. The NPLUT can use factors, including, but not limited to, time of day, day of week, date, driver, driver age, location where driver learned to drive (Boston drivers always drive fast), special event occurrence (e.g., football game in proximity), construction, precipitation, temperature, etc.

Within the NPLUT, each BGR and Node Pair has a unique designator or name. Many numbering schemes are possible for both. BGRs can be ordered with an ordinal numbering scheme, a cardinal numbering scheme, an alphanumeric numbering scheme (with or without significance), or an identification scheme based on the BGR latitude and longitude. The internal numbering scheme should be focused at database and computational efficiency. The values used for the BGR ordering scheme do not need to be presented to the end user. In the event that it is advantageous to present BGR numbering or ordering to the end-user, a transform can be created to show the end-user BGRs with easy to reference designators (e.g., 1, 2, 3, etc.) This might be useful for certain fleet applications, such as vehicle for hire, where, currently, zones are used to distribute vehicles and orders.

For each node for each BGR, a unique designator needs to be assigned. A Node Pair designator would then be the unique designator for both nodes, as well as the designator for the associated BGR. To fully describe a Node Pair, one would need to identify both the BGR and the Node Pair. The node part of the Node Pair designator would be commutative to the system. In the real world, each node represents a point on a road as it passes through the boundary of a BGR. Therefore, a Node Pair designator will give two locations, either on the same road, or on different roads, which are both on the boundary of a particular BGR.

In the NPLUT, each Node Pair reference will have a value for each dependent variable (e.g., time, distance, fuel consumption, surface roads navigation, etc.). With each navigation traversing the Node Pair, the actual value will be measured or estimated. The actual value will then be stored in the NPLUT, along with independent variables related to the trip, such as age of driver, gender of driver, profession of driver, type of vehicle, age of vehicle, time of day, day of week, date, weather, etc. After each navigation, intermediate ANOVA and MANOVA values (i.e., sum, sum of squares, etc.) can be stored and associated with the Node Pair trip. In this way, when a particular user navigates, an adjusted value for each Node Pair can be presented.

The feedback used to adjust the values given for each Node Pair can be a simple least squared error calculation, an error function that more heavily favors recent events, or other commonly used control system error correction methods. Truly predictive traffic is no more than correctly identifying the dependent variable of interest, and capturing the independent variables of interest. If one does that the system will predict traffic with as much accuracy as the data and math allow.

The BGRs, Node Pairs, and independent variables can be used in ways not currently available, due to the navigation being server based. For example, if weather starts affecting traffic in Chicago, it will typically reach Detroit within a given amount of time. A simple auxiliary process can be appended to the system, which, based off of the independent variables, estimates the latency period between weather in Chicago, for example, and Detroit, and the time-dependent probability of the weather from Chicago becoming weather that affects traffic in Detroit. The system can then create ETAs for future trips based off of impending weather, or other predictable future events. The ETAs for future trips can then be periodically updated, as the correlation of the data becomes more certain.

Multi-vehicle, multi-destination ("MVMD") navigation is a generalization of a single vehicle going to a single destination problem. MVMD is usually associated with fleets. There can be many different kinds of MVMD problem. Delivery companies, such as Fedex or the Post Office, have a MVMD problem. Repairmen and cable companies, who make in-house visits, have a MVMD problem. Trucking companies have a MVMD problem. Taxi cabs and limousines have a MVMD problem. We define Assignment as giving one or more destinations to a single vehicle. The sequence of destinations assigned to a single vehicle are called a Route. We define Constraint as a limitation on the sequencing of destinations for one or more vehicles.

There are many types of Constraints. First, let's define a Minus Stop as a destination at which a passenger or load is disembarked. A Plus Stop is a destination at which a passenger or load is added to the vehicle. A Load-share is a Constraint in which the Route ends with two or more Minus Stops, and the maximum weight or maximum size of all items in the load is limited. A Ride-share is a Constraint in which the Route ends with two or more Minus Stops, and there is a limit on the total number of passengers in the vehicle at a given time. An Immediate Linkage is a Constraint in which a given destination must immediately follow a given origin. A Linkage is a Constraint in which a given destination must follow a given origin in a given vehicle. Constraints can also be fleet-specific. For example, a particular taxicab company has a service standard requiring orders be picked up within 20 minutes, which would be a solution Constraint.

The process for generating Routes for vehicles is called Dispatching. The discrete database entries requiring a vehicle to go to a Destination is called an Order. An Order may consist of one origin and one destination, one origin and several destinations, or several origins and several destinations. For the present invention, Dispatching for 2 or 2,000 vehicles is the same. First, a dependent variable needs to be selected for the fleet. All destinations for all Orders and all vehicles are entered into the Dispatching database. The system will start by minimizing the number of BGRs traversed by the entire fleet, going to the first destination for each vehicle, while honoring any Constraints. This ends up being simple matrix math due to the way the BGRs and Node Pairs are organized. Each additional destination is approached the same way, with the previous destination acting as a new origin. If the Dispatching fails because a particular Route violates a Constraint, the system will iterate, giving a preference to the destination(s) that caused the Constraint violation. In this manner, the system quickly identifies the potential Constraint violations, and will attempt to optimize with no Constraint violations. Sometimes, no solution will exist that doesn't violate the Constraint. The system is designed to provide the optimized solution with the least Constraint violations. If desired for a particular fleet, the system can provide additional optimized solutions which have more Constraint violations. In this way, the fleet operator can determine the appropriate trade-off between optimizing Routing and having service variations (Constraint violations).

The MVMD problem, in its limit, can be used for a comprehensive traffic management system. As more vehicles use the limited number of roads in congested urban area, municipalities will search for some overall solution that keeps traffic moving. In a comprehensive traffic management system using the MVMD approach defined above, BGRs would have a saturation level for the overall number of vehicles. The traffic management system could level-load all BGRs in congested urban areas, minimizing the overall time it takes all vehicles in the area to reach their destination. This solution would effectively increase the overall capacity of the road network.

The system can also accommodate multiple service types within the same fleet. For example, a passenger transportation company may have both limousines, taxis, and a shared-ride service. The system can easily handle this for the fleet operator. Each service type is handled separately: limousine Dispatching is optimized for limousine Orders; taxi Dispatching is optimized for taxi Orders; and shared-ride Dispatching is optimized for shared-ride Orders. However, the system has one important feature for multiservice fleets. When Dispatching fails to find a route for a service with no Constraint violations, the system, consistent with the fleet operator's rules, can attempt to service the Constraint violations using other service-type vehicles. For example, if a ride-share Order causes a Constraint violation, the fleet operator can service it with a taxi or limousine. Additionally, the system will be offering the dispatcher at the fleet solutions for even difficult problems. For example, if the Constraint violation is with the limousine service, the system can offer the dispatcher solutions using taxis or shared-ride. In this way, the customer service representative trying to fulfill the Order for a limousine can present the passenger the widest variety of options: here's how long a limousine will take, here's how long a taxi will take, here's how long a shared-ride will take.

Ride-sharing and Load-sharing are further complicated by the fact that sequencing of stops is a separate mathematical problem from grouping the trips, but they are directly related. The order of stops can is determined by the system with the following method. Determine the midpoint of all Plus Stops ("PSM"). Determine the midpoint of all Minus Stops ("MSM"). Find the midpoint between PSM and MSM ("MID"). The Plus Stop furthest from MID is the first pick-up point. The Minus Stop furthest from MID is the last drop-off point.

For some fleets it is also necessary to stage vehicles. For example, taxicabs when there are no current Orders need to be staged, or police officers when there are no current calls. Within a given service area, each BGR has a time-dependent Order density (e.g., how many Orders in an hour). The time-dependent Order density for each BGR in a service area can be used as a pseudo-Order. The system can take the number of free vehicles and solve for the pseudo-Orders as if they were real Orders. In this way, the free vehicles will be distributed to the most likely locations, when considering all of the fleets Constraints.

BRIEF DESCRIPTION OF THE DRAWINGS

There are thirteen relevant drawings.

DETAILED DESCRIPTION OF THE PREFERRED EMBODIMENTS

The following description represents the inventors' current preferred embodiment. The description is not meant to limit the invention, but rather to illustrate its general principles of operation. Examples are illustrated with the accompanying drawings.

Figure 7:
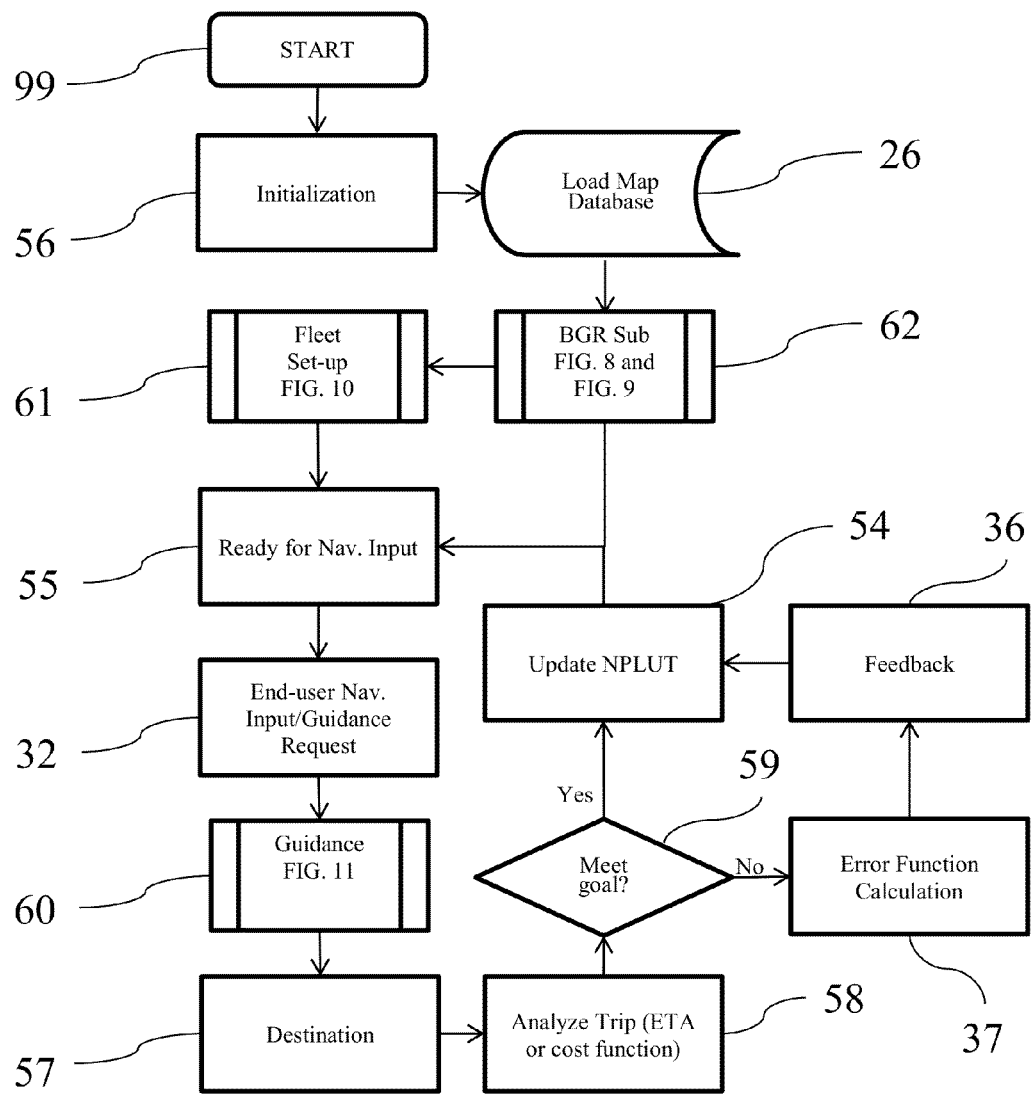
FIG. 7 shows a flow chart for the high level software method embodied by the present novel system.

FIG. 7 shows a high level flow chart for the software method associated with the system. Some operations are only performed on set-up of operation: 99 initial START, 26 loading map database; 62 create BGRs through sub-routine, and 56 system initialization. The map database 26 can be purchased from any map database vendor, or a crowd-sourced map database can be used. The system initialization includes such administrative routines as forming the NPLUT, populating the NPLUT with any available data, creating a user database, populating the user database with any available data, and similar tasks. Once the system has been initialized 56 and the BGRs have been created with the BGR sub 62, the system is capable of taking navigation input 55.

Figure 13:
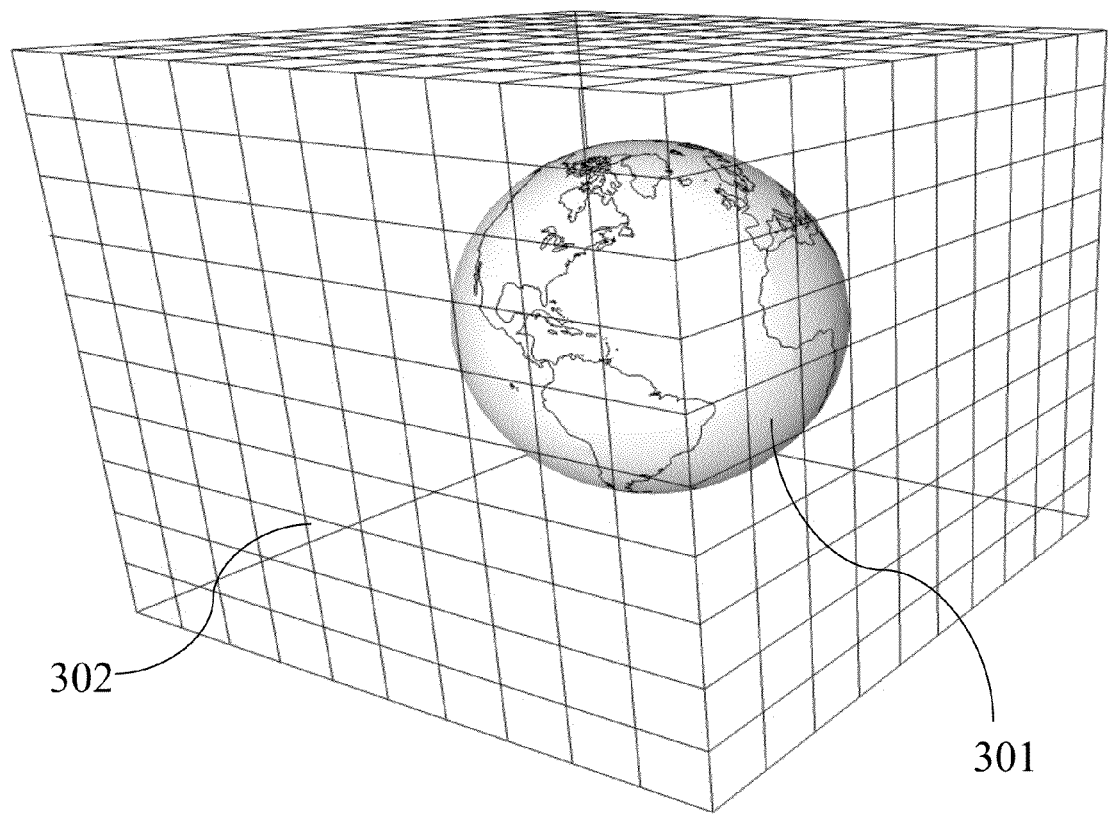
FIG. 13 shows the Earth inscribed in a tessellated cube.

FIG. 13 shows the Earth 301 inscribed in a tessellated cube 302. On a computer, the virtual Earth 301 can be rotated or tilted until a geographic land mass of interest is centered. Under almost all circumstances, even though the Earth 301 is an oblate spheroid, the geographic region of interest can be made to be almost parallel with a face of the inscribing cube 302. By properly selecting the size of the tessellation on the cube 302, one can influence the size of the BGR projected onto the Earth 301. This method is called Virtual Tessellation, because the pattern on the Earth 301 is not technically a tessellation, because all of the BGRs will not be the same shape and size.

Figure 8:
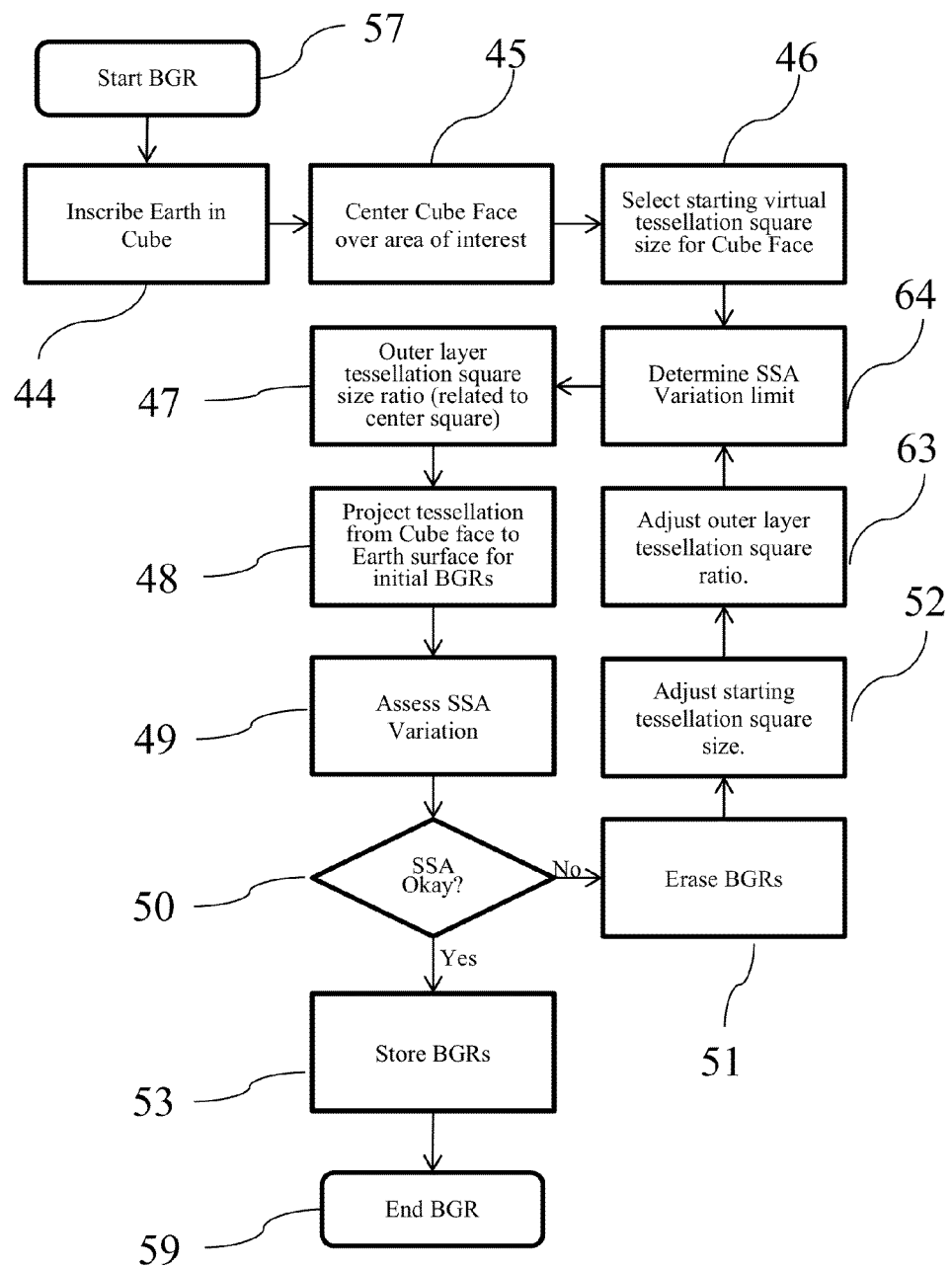
FIG. 8 shows a flow chart for creating BGRs through virtual tessellation in the resident server.

FIG. 8 shows a method of generating BGRs using Virtual Tessellation. First, the system inscribes the Earth in a cube 44. The center of the cube face 45 is centered over the geographic region of interest. A starting tessellation size 46 for the face of the cube is selected. The Standard Surface Area ("SSA") is the target surface area for the BGRs. A BGR SSA of approximately 1 sq. km seems ideal. Next, the variation limit for the SSA 64 is set. This number should be small (less than 10%). All BGRs should have a surface area very close to the SSA in order to minimize the potential for confounded data (non-orthogonal independent variables during an analysis of variance). If desired, the size of the tessellation squares 47 on the inscribing cube can be varied. Although this is computationally more difficult, it will minimize SSA variation (only the inner most piece is a square, with each proceeding layer being rectangles with higher and higher aspect ratios. The cube tessellation is projected onto the Earth 48 to create initial BGRs. The SSA of all BGRs is assessed 49. If the SSA analysis is okay 50, the BGRs are stored 53, and the BGR generation process ends 59. If the SSA analysis is not okay 50, all the BGRs are erased 51. Next, the system adjusts the starting tessellation size 52, the outer layer tessellation ratio (how quickly the outer layers of the tessellated cube face become rectangles of higher and higher aspect ratio) is adjusted 63, and adjust the SSA variation limit 64. The whole process is then started again 47.

Figure 9:
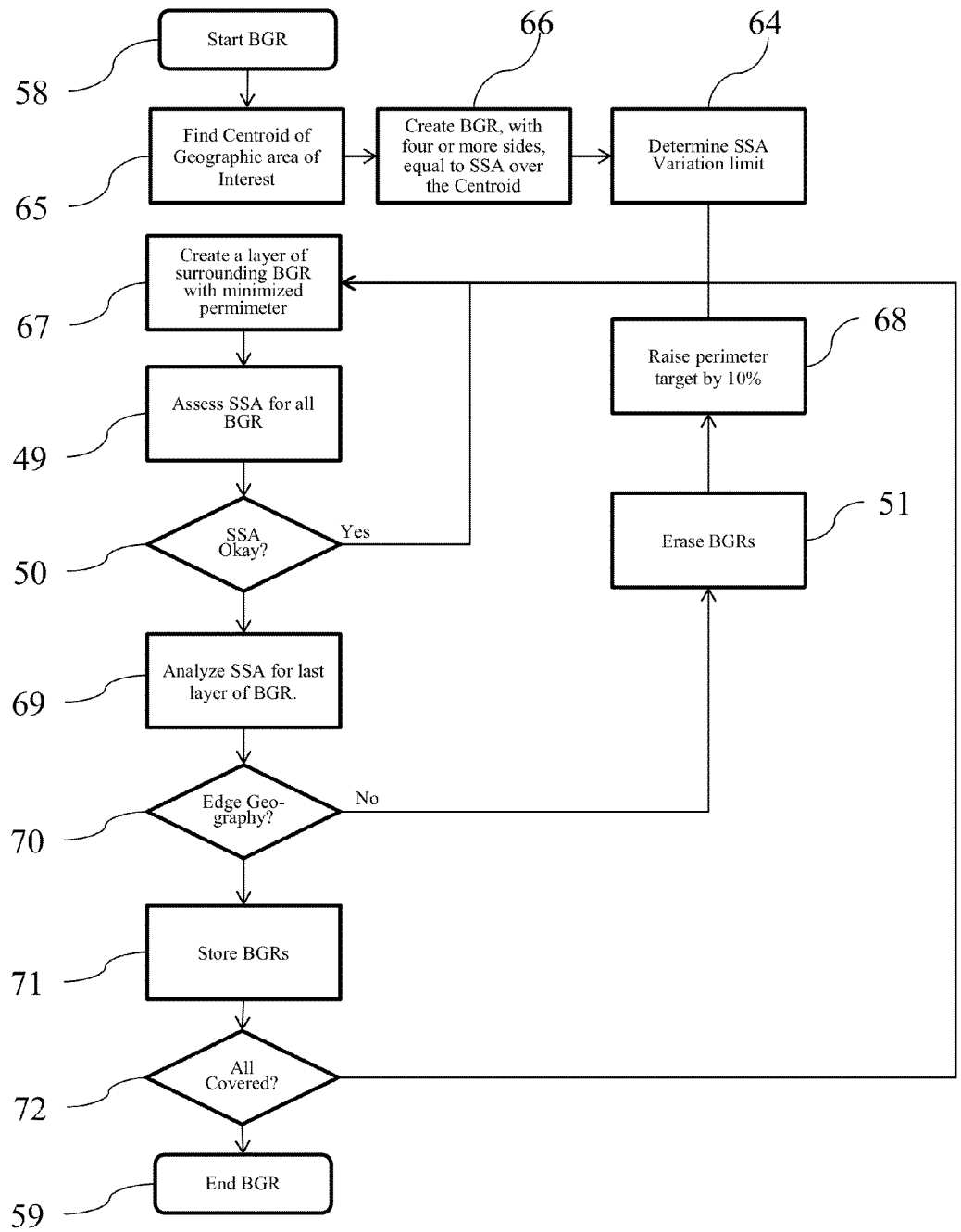
FIG. 9 shows an alternative method for creating BGRs in the resident server.

FIG. 9 shows the flow chart for an alternative embodiment for generating BGRs. The process is started 58 by finding the centroid of the geographic region of interest 65. A single BGR is created 66 with a surface area equal to the SSA and at least four sides. The SSA variation limit is set 64. A layer of BGRs is created around the existing BGR(s), in which the new layer of BGRs has its perimeter minimized 67. The SSA for the layer is analyzed 49. As long as the SSA analysis is okay, additional layers of BGRs are added. If the SSA is not okay 50, the SSA for just the last layer is analyzed 69. If the last layer includes BGRs which overlap the border of the geographic region of interest 70, and that is the sole cause of the unacceptable SSA, the BGRs are stored 71. If it is not edge geography 70, the last layer of BGRs is erased 51. The allowable maximum perimeter will be increased by 10% from the previous iteration 68, and a new layer of BGRs will be created 67. The process continues until the entire geographic region of interest is covered with BGRs 72.

Figure 10:
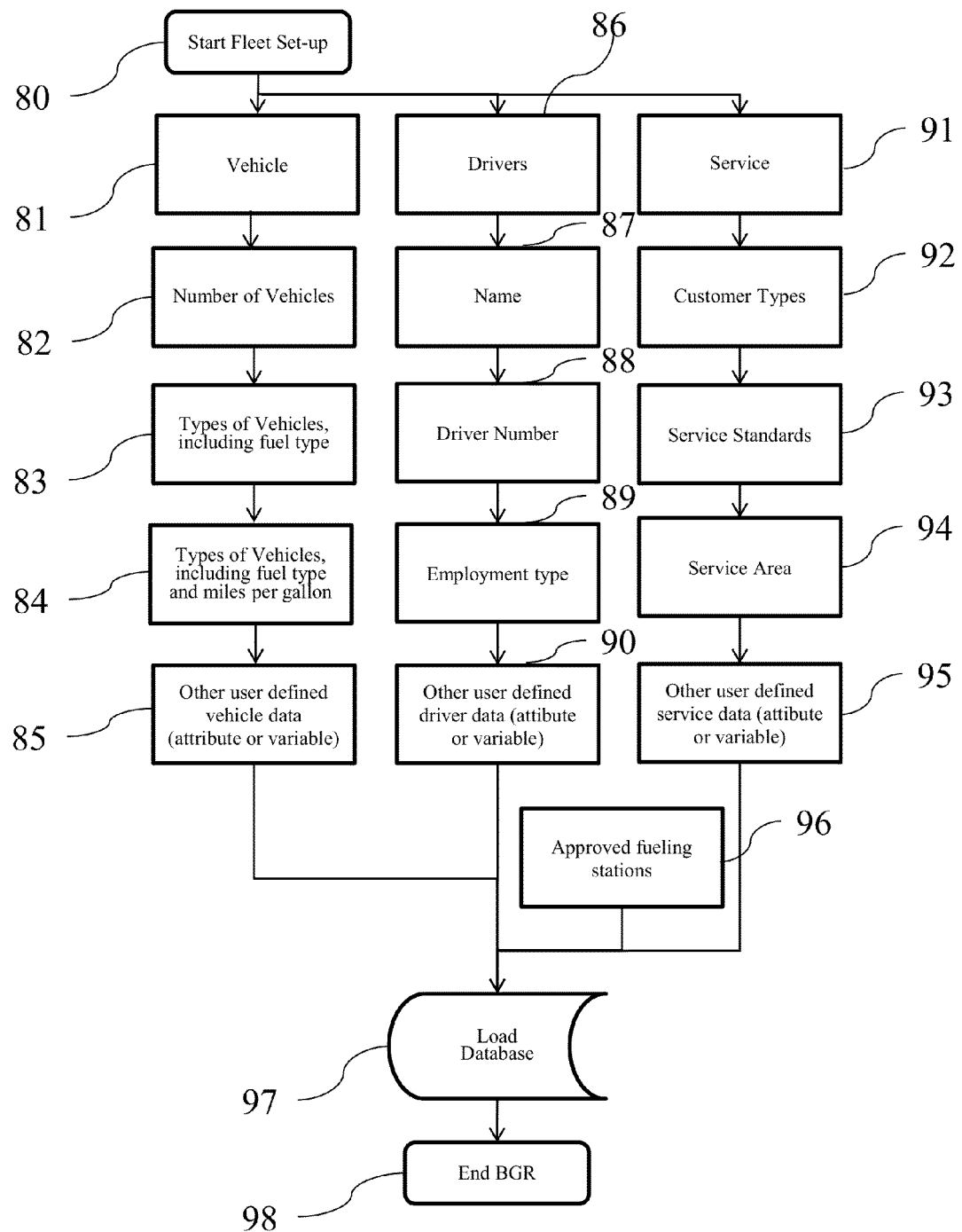
FIG. 10 shows a flow chart for fleet customer set-up on the resident server.

In FIG. 7, once the BGR routine 62 has occurred, Fleet Set-up 61 (FIG. 10) can occur. In FIG. 10, each customer or fleet is enrolled with a Fleet Set Up 80. This includes populating a database with information about the Vehicles 81, Drivers 86, and Services Offered 91. Data collected about Fleet Vehicles 81 includes number of vehicles 82, types of vehicles (including fuel type) 83, mileage of vehicles 84, and other user defined vehicle data (independent variable or attribute data) 85. Data collected about drivers includes name 87, driver number or identifier 88, employment type (employee, independent contractor, owner/operator, etc.) 89, and other user defined driver data (independent variable or attribute data) 90. Data collected about fleet services includes customer type 92, service standards 93, service area 94, and other user defined service data (independent variable and attribute data) 95. The database also allows user defined fueling stations 96. Once all of the data has been defined, it is loaded into a database 97, and the routine ends 98.

Figure 1:
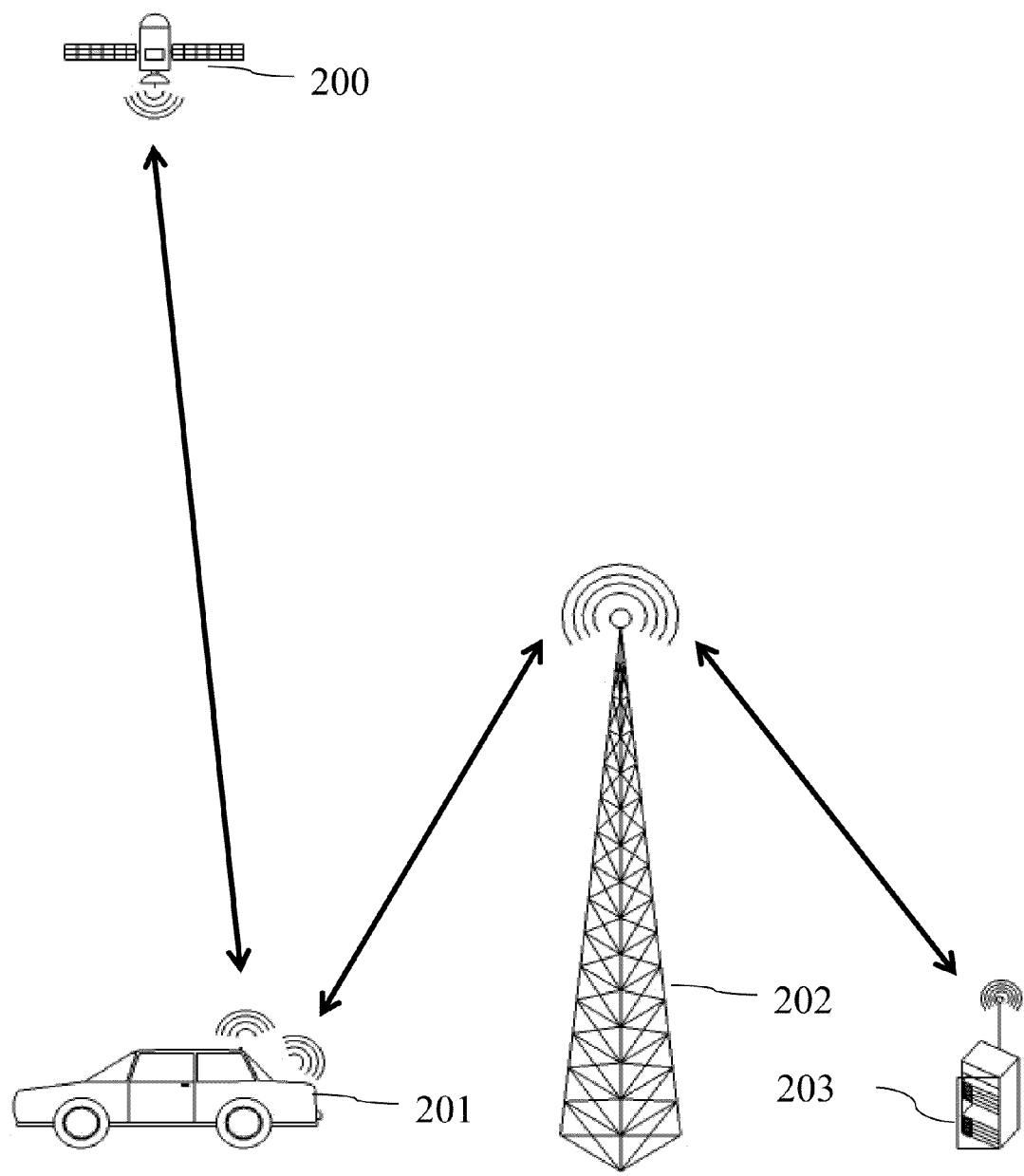
FIG. 1 is a system communication perspective drawing.

From FIG. 7, End User Nav Input Request 32 is received via a wireless means. FIG. 1 shows an embodiment of wireless communication and geo-location, which is necessary for navigation. The end user is in a vehicle 201, which has a remote electronic device ("RED"), either built-in or mounted. The vehicle 201 geo-locates via a GPS chip-set, a gyro, and/or a satellite transceiver. A plurality of satellites 200 provides GPS signals to the vehicle's 201 GPS transceiver. The vehicle 201 is then able to communicate its location to a central server 203, using a wireless network 202. The wireless network 202 can be a cellular or mobile phone network, a radio-frequency network, or other wireless means. The transmission could also be made over a mixed means network, such as a wi-fi network that downloads and uploads requests to the server via a wired internet connection (not shown).

Figure 2:
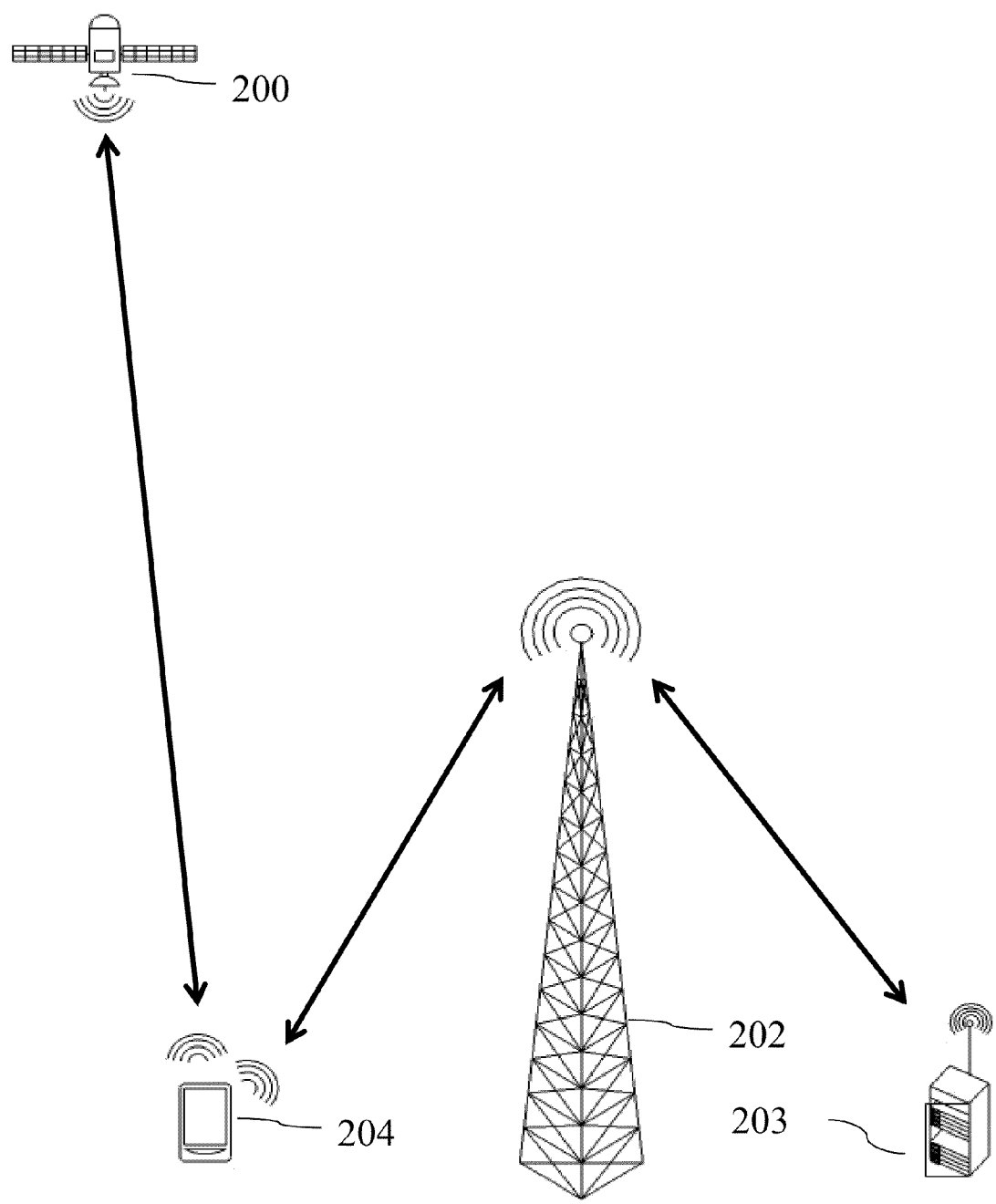
FIG. 2 is an alternative embodiment system communication perspective drawing.

FIG. 2 shows an alternative embodiment for the communication and geo-location system. In FIG. 2, the vehicle 201 has been replaced with a cellphone, MDT, or RED 204. The cellphone, MDT, or RED 204, geo-locates via the satellite network 200. The cellphone, MDT, or RED 204, communicates with the server 203, via a wireless network 202.

Figure 3:
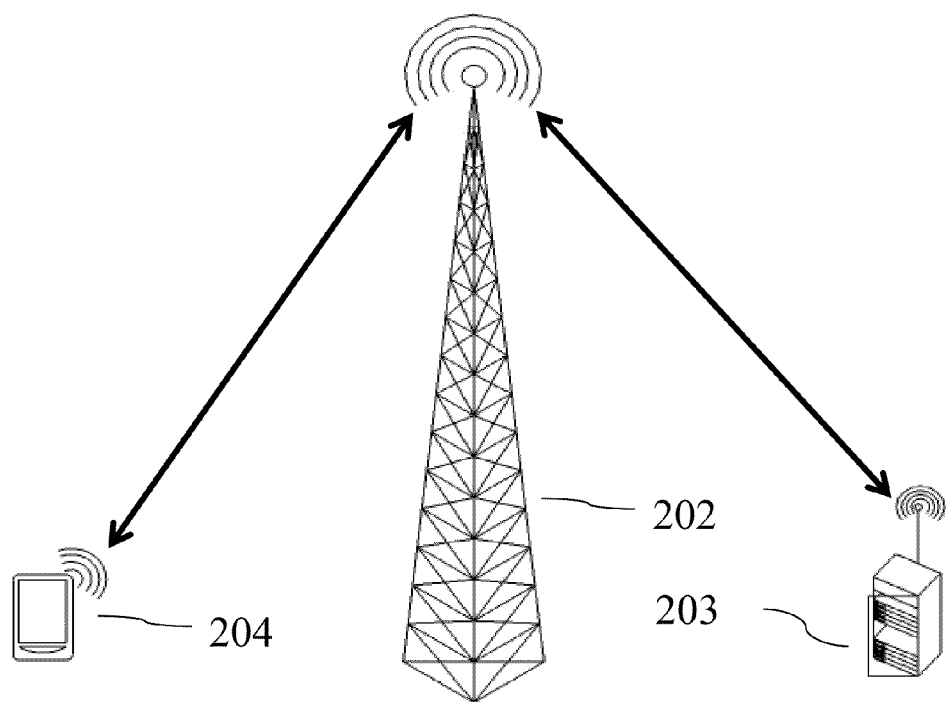
FIG. 3 is an alternative embodiment system communication perspective drawing.

FIG. 3 shows an alternative embodiment for the communication and geo-location system in FIG. 2. In this system, the wireless network 202 is used for both geo-location and communication with the server. The cellphone, MDT or RED 204 can use multiple cellphone towers or antennae to identify its current location. This data can be transmitted, along with a navigation request, to the remote server 203.

Figure 4:
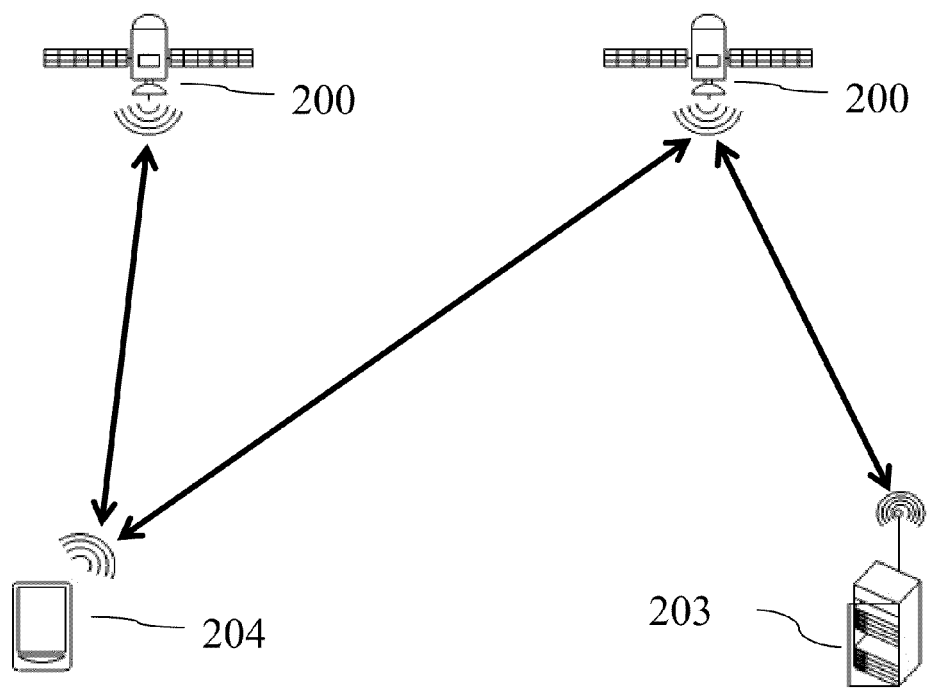
FIG. 4 is an alternative embodiment system communication perspective drawing.

FIG. 4 shows an alternative embodiment for the communication and geo-location system in FIG. 2. In this system, satellites 200 are used for both geo-location and communication. Although GPS satellites are not currently multi-tasked for communication, it is conceivable, in the future, that both geo-location information and communication would happen with the same satellite 200. However, this system is architected according to current satellite trends: one set of satellites 200 provides geo-location information, and another satellite 200 is used for communication to the remote server 203.

Figure 5:
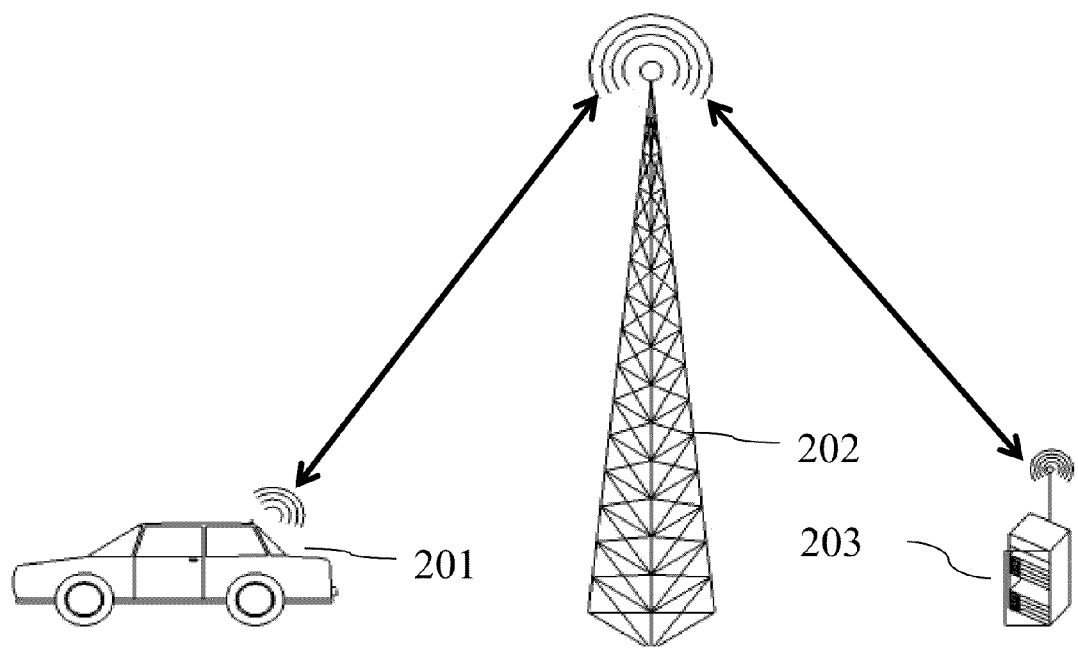
FIG. 5 is an alternative embodiment system communication perspective drawing.

FIG. 5 shows an alternative embodiment for the communication and geo-location system in FIG. 1. In this system, the wireless network 202 is used for both geo-location and communication with the server. The vehicle 201 can use multiple cellphone towers or antennae to identify its current location. This data can be transmitted, along with a navigation request, to the remote server 203.

Figure 6:
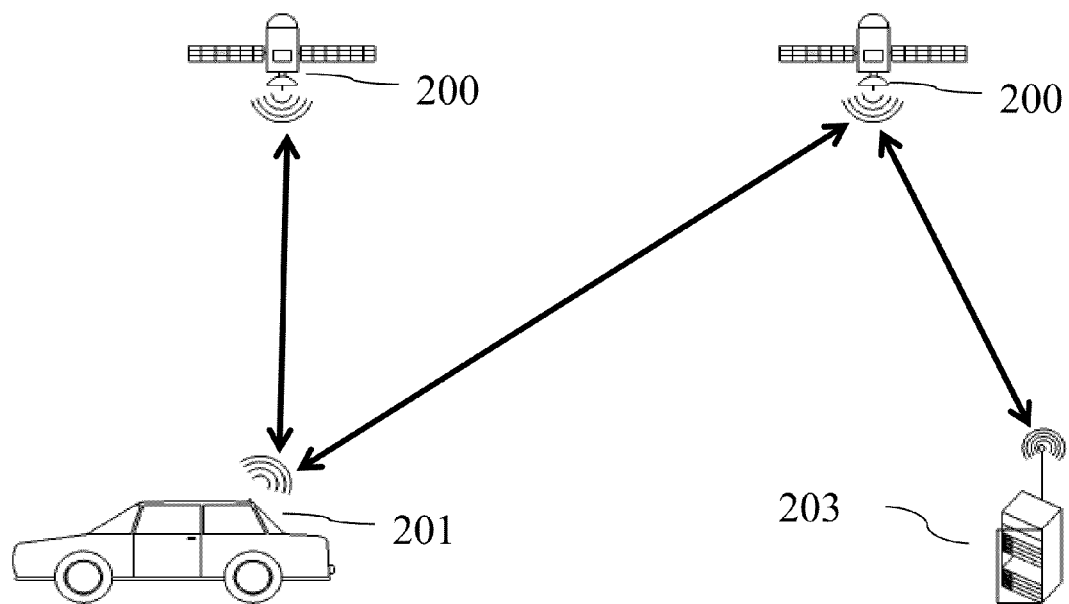
FIG. 6 is an alternative embodiment system communication perspective drawing.

FIG. 6 shows an alternative embodiment for the communication and geo-location system in FIG. 1. In this system, satellites 200 are used for both geo-location and communication. One set of satellites 200 provides geo-location information, and another satellite 200 is used for communication to the remote server 203.

Figure 12:
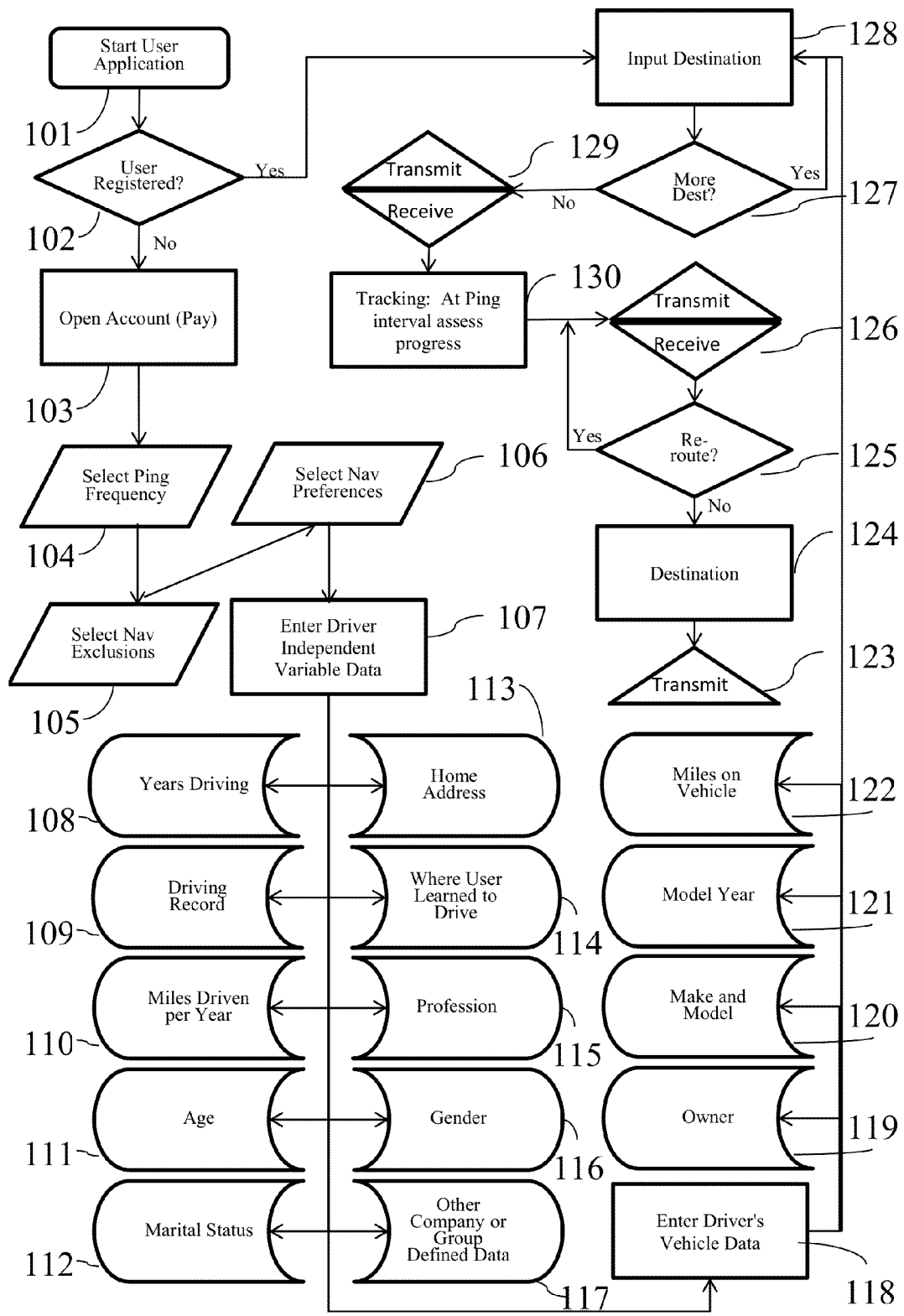
FIG. 12 shows a flow chart for the hand-held or remote electronic device software process.

In FIG. 7, an end-user nav request 32 is communicated through one of the communication and geo-location systems in FIG. 1 through FIG. 6. Whether a vehicle 201 or a cellphone, MDT, or RED 204, the user interacts with the system through a user software method, generally referred to as a user application. In FIG. 12, the User Application starts 101 by insuring that the user is registered 102. If the user is registered 102, destination input 128 occurs. The user can add multiple destinations 127, 128, either specifying the order or allowing the system to order the trip. Once input is complete 127, the data is transmitted 129 to the remote server via the means shown in FIGS. 1-6. At this point we will handle the remote server 203 as a black-box that produces a navigation route, given the destination input 128. The remote server 203 transmits the route, where it is received 129 by the end user. At pre-determined intervals, the end user's application 101 will ping 130 the remote server 203, by transmitting 126 its location. The remote server 203 will compare the user's progress versus what the remote server predicts the user's progress ought to be—If the progress towards the destination lies outside the acceptance criteria, the remote server 203 will transmit a re-route signal 125 to the user's application 101. The end user's unit will notify the end user of the re-route, while the remote server 203 provides an alternative route. The new route will be received 126 by the end user's application 101. Eventually, re-route or not, the end user will arrive at the destination 124. After arriving at the destination, the end user's application 101 will transmit a final ping 123 to the remote server 203, so that the remote server has a complete history of the trip.

When starting the end user application 101, if the user is not registered, the unit can allow registration by opening an account 103. After opening the account 103, the user selects ping frequency 104, navigation preferences 106, and navigation exclusions 105. The user then has to complete independent variables concerning him- or herself, and his or her vehicle. Driver information 107 includes years driving 108, driving record 109, miles driven per year 110, age 111, marital status 112, home address 113, where the user learned to drive 114, the user's profession 115, the user's gender 116, and other company- or group-defined data 117. The vehicle information 118 includes vehicle owner 119, make and model 120, model year 121 and miles on the vehicle 122. The independent variable data should be of very high quality, because the user will be aware that their accuracy in answering the questions may directly relate to how well the system can navigate for them.

Figure 11:
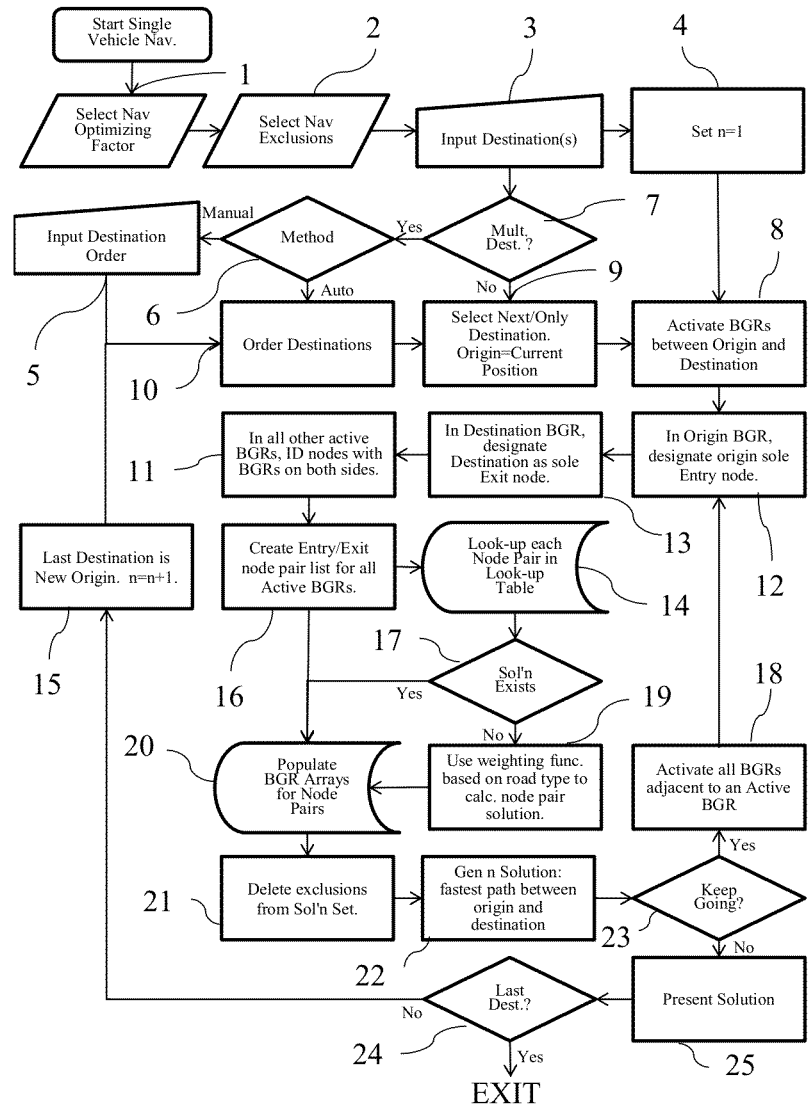
FIG. 11 shows is a flow chart of a server based navigation method using BGRs and Node Pairs.

FIG. 7 shows that Guidance 60 occurs after End User Input 32. In FIG. 11, Guidance 60 begins by selecting nav optimizing factors 1. Once the BGRs have been created, it is possible for the invention to create navigation solutions. FIG. 11 shows a single vehicle navigation solution. The user starts by selecting an optimizing factor 1, or dependent variable: time, distance, fuel, cost, or an user defined dependent variable. Next, the user, if desired, excludes certain solutions from consideration 2, such as interstates, tollways, bridges, or other potential routes. The user enters one or more destinations 3 using the input device. If inputting more than one destination, the user can select 6 an automatic 10 or manual 5 ordering of the destinations. When selecting a manual 5 ordering, the automatic destination ordering module 10 will defer to the manual entry. Once ordered, the origin and the next or only destination is identified 9. If there is only a single destination input at the beginning 7, the navigation core moves directly to identifying origin and destination 9.

To calculate between an origin and destination, the invention will identify the BGRs that lie, linearly, between the origin and destination 8, and designates them as Active. These BGRs are termed Gen 1. In the BGR containing the origin, the origin is designated the sole entry node 12. In the BGR containing the current destination 9, the current destination is designated as the sole exit node 13. In all other BGRs, Node Pairs are created by selecting only those nodes which have a BGR on both sides 11. The navigation core than creates a Node Pairs list for all Active BGRs 16. In multi-processor systems, the navigation core will simultaneously create a temporary BGR array for all Node Pairs under consideration 20, and survey the NPLUT 14 to see if solutions exist for any Node Pairs under consideration 17. If the Node Pairs solution exists in the NPLUT, it is placed in the temporary BGR array 20. If not, using weighting functions for each street classification, the invention makes dependent variable calculations for each Node Pair of each BGR 19, capturing route information for each potential solution. The invention will delete any exclusions from the potential solution set 21. Since only a limited set of BGRs are used for the initial calculation, not all nodes of each BGR is a potential entry and/or exit. The data generated from the nodes of interest can be stored in an array, in a temporary database format, or in any other data-handling format that allows quick access 20. This temporary data can be stored in cache storage, on the hard-drive, or in any other type of suitable memory element. In a multi-core processor environment, such calculations are speedy, because each BGRs can be independently calculated.

The invention then creates an initial trial route by finding the initial minimum solution from the origin to the destination, travelling only through BGRs that lie, linearly, between the origin and destination 22. As a boundary condition for the initial route calculation, the exit node of one BGR is the entry node of the adjoining BGR. By creating a matrix of possible solutions, the invention yields an explicit solution.

Once the initial trial route is identified, the solution engine adds all BGRs that were adjacent to Gen 1 BGRs 23, 18, and largely repeats the above process. The new BGRs are termed Gen 2. Gen 1 BGRs now use all nodes in the calculation. Gen 2 BGRs use a reduced set of nodes, because not all nodes have an adjoining BGR associated with them.

To calculate the Gen 2 trial route, the potential solutions calculated in the Gen 1 calculation are excluded, because they are found in the temporary array 20. The invention, again, applies the boundary condition that the exit node of one BGR is the entry node of the adjoining BGR. By creating a matrix of possible unique solutions (excluding Gen 1 solutions), the invention yields an explicit solution, the Gen 2 trial route 22.

The process is repeated for Gen 3, in much the same way as for Gen 2 23, 18. All BGRs adjoining Gen 2 BGRs are added to the calculation. All previously considered trial solutions are excluded from the potential solution set. An explicit solution for the Gen 3 trial route is calculated.

Call Gen A the optimum solution. The exit criteria is selected so that C generations are completed, where C=A+B, where C is the total number of generations, A is the optimum generation, and B is the number of desired divergent solutions calculated after the optimum solution. For example, if the Gen 1 trial route is preferable to the Gen 2 or Gen 3 trial route, and the calculations stop, presenting the Gen 1 trial route to the user as the preferred route, C=3, A=1, and B=2.

In practice, B is related to the distance between the origin and destination 23. Additionally, selection of B can be optimized through a simple error feedback function, where the error is related to the distance. The upper limit of B is set by the maximum speed limit. In other words, the process ends when the vehicle would have to exceed the maximum allowable speed limit around the periphery in order to offer a more preferable solution to the dependent variable than the currently available solution.

For MVMD navigation, the above process is repeated for all vehicles. Initial destinations are determined by minimizing the number of BGRs traversed in order for all vehicles to get to a preliminary destination. For each vehicle and destination pair, the above algorithm creates a Route. At the first destination each vehicle is again assigned a destination, with the system attempting to minimize the number of BGRs traversed in order to get all vehicles to their next destination. In this way, it is possible to handle multiple vehicle multiple destination problems, with or without Constraints.

We claim:

1. A method and system of navigation guidance, containing, at a minimum, an end-user device with means for inputting destinations and receiving guidance or routing; a map database, containing roads and, optionally, points of interest; a device and method for determining vehicle position; a server or other assemblage of memory and processing elements; a means for communicating between the end-user device and the server; a node pair look-up table (NPLUT) database, containing explicit solutions between each potential entry node and each potential exit node of every bounded geographic regions (BGR) of interest to the end user; and a navigation software core, resident on the server, having the capability to create BGRs of such a size that explicit navigation solutions are possible within the boundaries of the BGR, to identify Node Pairs for each BGR which might be part of a potential solution, to access the NPLUT to get solutions for each Node Pair, and optimize a navigation solution, that uses the Node Pair combinations between the origin and destination, based on the dependent variable provided by the end user and the independent variables which are inherently part of a solution database.

2. The invention in 1, in which the system solves for multi-vehicle-to-multi-destination problems.

3. The invention in 2, in which the system presents Routes to each vehicle.

4. The invention in 2, in which the system tracks each vehicle's progress along the Route.

5. The invention in 2, in which the system allows Dispatching for Ride- sharing or Load-sharing fleets.

6. The invention in 2, in which the system will re-route one or more vehicles when a single vehicle's progress along its route diverges from the predicted value by more than a user-defined amount.

7. The invention in 2, in which the system solves for the multi-vehicle-to-multi-destination problem, using user-defined Constraints.

8. The invention in 2, in which the software contains an error function calculator and a feedback routine to correct dependent variable values stored in the NPLUT database.

9. The invention in 2, in which each end-user's actual value for each Node Pair solution for dependent variables, including time, distance, fuel usage, cost, and any user defined dependent variables, as well as independent variables, are communicated to and stored in NPLUT, either while or after the end-user arrives at the destination.

10. The invention in 2, in which, for each dependent Node Pair value in the NPLUT, associated independent variable factors are captured and stored, both variable and attribute, including, but not limited to, time of day, date, day of the week, temperature, construction, precipitation, driver's age, driver's profession, driver's gender, vehicle type, vehicle age, vehicle mileage, and special event, which can be used to create ANOVA and MANOVA calculations of the dependent variables stored in the NPLUT, in order to give more accurate estimates during future navigation.

11. The invention in 10, in which the NPLUT database is compressed by storing only the necessary ANOVA or MANOVA sums and products from prior navigation iterations, and deleting the underlying data off of which the sums and products are calculated.

12. The invention in 2, in which each end-user's device memory only stores detail from Active BGRs.

13. The invention in 2, in which the communication with the server is made via a wireless or satellite connection to a plurality of vehicles, mobile telephones, mobile data terminals, or remote electronic devices.

14. The invention in 2, in which the server can also collect data from other data sources, including, but not limited to, NHTSA traffic sensor information, police report, local traffic reports, and construction reports, for inclusion in the NPLUT as either variable or attribute data associated with a Node Pair.

15. The invention in 2, in which the system is used to monitor and route traffic in congested urban areas.

* * * * *